United States Patent [19]

Boudreau

[11] Patent Number: 5,224,184
[45] Date of Patent: Jun. 29, 1993

[54] OPTICAL MULTI-CHIP INTERCONNECT

[75] Inventor: Robert A. Boudreau, Hampton, N.H.

[73] Assignee: GTE Laboratories Incorporated, Waltham, Mass.

[21] Appl. No.: 703,557

[22] Filed: May 21, 1991

[51] Int. Cl.[5] .............................................. G02B 5/14
[52] U.S. Cl. ...................................... 385/35; 385/24; 385/33; 385/46
[58] Field of Search ............... 350/96.11, 96.15, 96.18, 350/96.20, 96.21, 320, 96.16; 385/15, 24, 33–35, 46, 47, 50, 14

[56] References Cited

U.S. PATENT DOCUMENTS

| | | | |
|---|---|---|---|
| 3,912,364 | 10/1975 | Hudson | 350/96.18 X |
| 4,278,322 | 7/1981 | Mahlein | 385/50 |
| 4,447,114 | 5/1984 | Koene | 350/96.20 |
| 4,752,108 | 6/1988 | Vollmer | 385/14 |
| 4,786,131 | 11/1988 | Mahapatra et al. | 385/24 X |
| 4,823,403 | 4/1989 | Twietmeyer | 385/24 X |
| 4,842,391 | 6/1989 | Kim et al. | 350/96.18 |
| 4,875,750 | 10/1989 | Spaeth et al. | 350/96.18 |
| 4,904,043 | 2/1990 | Schweizer | 350/96.18 |
| 4,978,189 | 12/1990 | Blonder et al. | 350/96.18 X |
| 5,039,192 | 8/1991 | Basu | 385/50 X |

OTHER PUBLICATIONS

C. L. Lassen, "Integrating Multichip Modules Into Electronic Equipment", Proc. of IEPS Tech. Conf., pp. 3–55 Sep. 1990.
C. H. Henry, et al., "Glass Waveguides on Silicon For Hybrid Optical Packaging", J. Lightwave Technology, vol. 7 p. 1530, Oct. 1989.
S. Esener, et al., "Free Space Optical Interconnects For Microelectronics and Parallel Computing", SPIE Proceedings of the Tech. Conf., vol. 1178; p. 84, 1989.
D. Z. Tsang, "Free-Space Optical Interconnects", SPIE, Proc. of Tech. Conf., vol. 994, p. 73, 1988.
J. S. Prokop, et al. "Technology Solutions For Multichip Module Manufacturing Problems", Proc. of IEPS Tech. Conf., pp. 401–470, Sep. 1990.

*Primary Examiner*—Akm E. Ullah
*Attorney, Agent, or Firm*—Lawrence E. Monks

[57] ABSTRACT

An opto-electronic interconnect is disclosed that provides for optical communication between chip devices. Optical signals, transmitted from one of the edges of a first chip device, are directed by a lens focusing apparatus to the edge of a second chip device, whereupon the signal is detected. The optical ports for transmission or reception of the optical signals are grouped into an optical segment, which may have either a semi-circular or planar geometry.

14 Claims, 8 Drawing Sheets

| MATERIAL (REFRACTIVE INDEX) | DIAMETER | WORKING DISTANCE | SOURCE |
|---|---|---|---|
| QUARTZ (1.5) | 0.250 mm<br>1.000 | 0.500 mm<br>2.000 | |
| BK-17 (1.517) | 0.250<br>1.000 | 0.483<br>1.934 | NIPPON ELECTRIC |
| RUBY (1.67) | 0.250<br>1.000 | 0.375<br>1.492 | GENERAL RUBY |
| SAPHIRE (1.75) | 0.250<br>1.000 | 0.333<br>1.320 | GENERAL RUBY |
| TAF-3 (1.8) | 0.250<br>1.000 | 0.312<br>1.250 | NIPPON ELECTRIC |
| LaSF9 (1.818) | 1.00 | 1.223 | MILES GRIOT |
| YAG (2.25) | 0.250<br>1.000 | 0.200<br>0.800 | DELTRONIC |

FIG. 5

OPTICAL MULTI-CHIP INTERCONNECT

FIELD OF THE INVENTION

This invention relates generally to the interconnection of opto-electronic optical components which generate or process optical or opto-electronic signals, and more particularly to optical signaling for such devices.

BACKGROUND OF THE INVENTION

An opto-electronic package is a housing that provides protection and support for both active and passive opto-electronic optical devices contained within it. The devices and their ability to interconnect with other components define an optical-electronic circuit and determine the functionality of the package. The packaging may also include a means of connecting the internal optical circuitry with the external world. Typically, this is accomplished by conventional electrical means or optical fiber.

Circuits that permit optical signaling offer substantial advantages over circuits that are limited to only electronic signaling. Optically modulated signals can carry more data, and at higher speeds than electrical signals. Further, optical signals are immune to electromagnetic interference and can be employed over longer distances with minimal attenuation. Optical signals, unlike electronic signals, can interpenetrate each other spatially without interfering with each other.

It is expected that optical signaling will become an increasingly important technology in interconnecting internal computer components. Computers are expected to emerge based on neural network architectures, where computer power is based on quantity of interconnect rather than quantity of memory. Optical signaling is expected to play a key part in these neural designs. There is a growing list of optical devices that need to be interconnected. The list of devices includes active discrete devices, passive discrete devices, and photonic integrated circuits. Examples of active discrete devices are photodetectors, modulators, and active waveguides that switch, control, amplify, emit light or detect light. Examples of discrete passive devices include straight and bent waveguides, splitters that branch the flow of light, and couplers that channel specific wavelengths. The photonic integrated circuits combine functions and are usually fabricated on a specific substrate such as InP or GaAs. Examples might include laser or detector arrays, integrated optical pre-amplifiers, lasers with integrated beam expanders or tunable DFB's.

Electronic integrated circuits have been electrically interconnected into large high-density circuits using a multi-chip module packaging approach as described by the International Electronics Packaging Society in "Multi-chip Modules", Proceedings of the IEPS Technical Conference, The IEPS Society, Wheaton, Illinois, pps. 3–55 and 401–470, (1990). These modules consist of mechanically precise substrates that support tape automated bonded (TAB) or another type of unencapsulated electronic chips. Precision deposited high frequency electronic signal lines are buried in the substrate, providing the means of electrically interconnecting the chips. The modules offer dense, high chip count packaging for high frequency electronic circuit applications. The modules, however, only provide electrical interconnect. There is no optical interconnect capability. The current invention discloses a means for optically interconnecting optical devices and a means for implementing the interconnect in a multi-chip modular form.

Present optical interconnect technology is either fiber based, planar waveguide based, or free-space transmission based. The current approaches to interconnecting chips within a package have specific disadvantages making them costly, inefficient or difficult to implement. A fiber based interconnect is most common, providing the basis for fiber optic links between separate packaged modules. These links are usually separated by large distances, since fiber offers the best coupling efficiency for distant optical interconnect. But, while fiber is suited for coupling at a distance, it is rarely if ever used for connecting optical devices within the same package. A lens is required to magnify the elements of the laser array to mode match with the larger core size of optical fiber. Dimensional restrictions prohibit the placement of optical fiber closer together than the distance of its own diameter. The fiber tips need special shaping into lenses or optical flat cleaves that can not be easily formed for extremely short fiber lengths. Installation of short fibers is very difficult, requiring a separate $+/-0.5$ μm tolerance and stable alignment at each end of the fiber.

A planar waveguide based interconnect, as described in C. H. Henry, G. E. Blonder, and R. F. Kazarinov, "Glass Waveguides on Silicon For Hybrid Optical Packaging", J. Lightwave Technology, vol. 7 page 1530 (1989) has recently been described, but development of the technology is slow due to the difficulty of connecting the planar waveguides to the device chips. Further, there is a considerable amount of optical loss within a planar waveguide because optical quality is not as good as fiber.

Planar waveguides employ a substrate, such as silicon or glass, that has patterned light pathways on or in its surface. With glass substrates, planar waveguides channel and confine light with patterns of dopants that locally raise the index of refraction within the pattern of guides. With silicon substrates, light is usually guided through silica glass ridge planar waveguides that are formed on the silicon surface.

Unlike fiber, a planar waveguide based interconnect can be used to connect separate devices within the same package. The optical devices are either grown into wells on the substrate or mounted that way, such that the active elements of the devices will butt-couple their light into or out of the ends of the planar waveguides.

One major disadvantage of planar waveguide based interconnect is that the optical coupling efficiency through the butt coupled edges is worse than that for fiber based interconnect. The mechanical tolerances are tight in an attempt to reduce the gap between the planar waveguide and the device. The larger the gap, the worse the coupling. Regrowth to "fill" the gaps has been attempted, but processing is difficult since the dissimilar silicon based planar waveguides and III-V optical device materials are present simultaneously during processing. Removal of optical devices for repair or replacement is virtually impossible.

Like planar waveguides, free space transmission can provide signal transmission between optical devices within the same package. This technology does not utilize a planar waveguide but rather projects the light through space to its destination. One version of this interconnect, as described by S. Esener and S. H. Lee in "Free Space Optical Interconnects for Microelectronics and Parallel Computing", SPIE Proceedings of the Technical Conference, vol. 1178 page 84 (1989), projects light onto a hologram which then reflects it back to specific receivers. The hologram is located in a separate plane above the optical devices. Another form of this interconnect, as described by D. Z. Tsang, "Free-space Optical Interconnects", SPIE Proceedings of the Technical Conference, vol. 994 page 73 (1988), permits transmission between surface emitters and detectors located on separate planes or boards held parallel to each other. Tiny lenses at each element beam the light across to the neighboring board.

There are several drawbacks to the holographic, reflecting, and parallel board type free space interconnect. All require either surface emitting lasers, detectors or other devices, but at present most optical devices interconnect through their edges. Coupling efficiency is poor owing to the difficulty in maintaining parallelism between the reflector plane and the circuit board plane. The placement of tiny microscopic projection lenses at each optical element is costly.

OBJECTS OF THE INVENTION

Accordingly, it is a primary object of this invention to obviate the above noted and other disadvantages of the prior art.

It is a further object of this invention to provide an optical interconnect between chip devices.

It is a still further object of this invention to provide an optical interconnect allowing for a large number of connects per chip device edge, while utilizing the simplicity of a single lens.

It is a still further object of this invention to provide for an optical interconnect that allows a high coupling efficiency and simultaneous alignment of a plurality of optical interconnects.

It is a still further object of this invention to provide for an optical interconnect that exhibits low cross-talk.

It is a still further object of this invention to provide for an optical interconnect that allows for physical separation of devices, thus avoiding reliability problems associated with collisions of optical facets.

It is a still further object of this invention to provide for an optical interconnect that allows device interchangeability for those devices exhibiting the same optical footprint.

SUMMARY OF THE INVENTION

The above and other objects and advantages are achieved in an aspect of this invention by providing a means for optically interconnecting integrated photonic circuits or devices to each other within a package module. An optical interconnect is provided by optically coupling an edge segment of a chip device to a corresponding edge segment of another chip device through a single lens. An edge segment is composed of one or more optical ports for the transmission or reception of optical signals. A single bulk optic lens or a single compound lens which mode matches the separate images of the photonic elements from one device edge onto the other device edge is utilized. A large number of optical ports are possible within an edge segment, as they are all imaged through the one lens. The optical ports of one chip device are matched to the corresponding optical ports on another semiconductors' edge. The number of lenses required depends on the number of separate edges needing coupling A ball lens having a large numerical aperture and low aberration over the angular width of the numerical aperture is preferred in that this insures that a large number of elements are capable of efficient coupling through a single lens.

BRIEF DESCRIPTION OF THE DRAWINGS

FIG. 5 shows coupling data for various ball lenses which might be used in the instant invention. Coupling data shown is for the case where a magnification of one is utilized.

DETAILED DESCRIPTION OF THE INVENTION

For a better understanding of the present invention, together with other and further objects, advantages and capabilities thereof, reference is made to the following disclosure in conjunction with the accompanying drawings.

Figure 1:
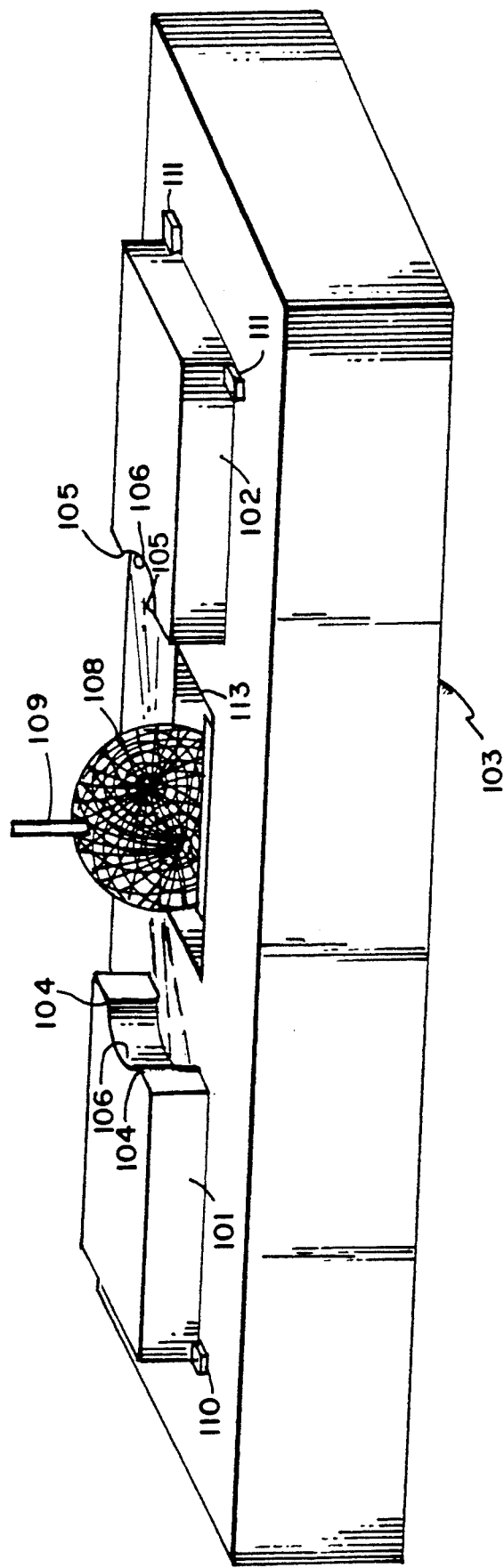
FIG. 1 is a perspective view of one embodiment of the current invention, showing the interconnect of two chip deices, each having a semi-circular optical segment for communication.

Referring to FIG. 1, chip device 101 is shown. Semiconductor device 101 communicates information with chip device 102 via optical signals. Neither chip device 101 nor chip device 102 are application specific, and may comprise such functionality as a DMA controller, a RAM memory controller, or a USART. Semiconductor devices 101 and 102 may be either active or passive devices. Examples of passive devices are couplers and splitters. Semiconductor devices 101 and 102 may be based on different materials.

Semiconductor device 101 and chip device 102 are coupled to mechanical support 103. In one embodiment of the current invention, a chip device 101 is bound to support 103 with its epitaxially grown active region down against the support. In a further embodiment of the invention, support 103 is a precision fabricated substrate. The waferboard substrate is preferably made from a photolithographically definable, low thermal expansion but high thermal conduction material with any desired dielectric properties such as silicon, glass, or ceramic. Thus multi-chip circuits can be made from a combination of all electrical, all optical, or electro-optical chip devices. As was stated above, a chip device may be optically passive or active and need not be fabricated from the same substrate wafer material. This allows one to combine Si, GaAs, InP, or doped or undoped glass devices in the same circuit, within the same package as might be required. Semiconductor device 101 and chip device 102 are coupled to support 103 to a positional accuracy of about 7-20 microns. Semiconductor devices 101 and chip device 102 are precisely positioned on the substrate using registration marks 110 and 111 respectively. Placement of chip device 101 is achieved by registration to a visible mark or physical stop 110. Likewise, placement of chip device 102 is achieved by registration to a visible mark or physical stop 111.

Semiconductor device 101 includes a plurality of optical ports shown as 104 which are processed into the edge of the device, for communicating optical signals with chip device 102. Conversely, chip device 102 includes a complementary set of optical ports 105 for communicating optical signals with chip device 101. Optical port 105 is likewise processed into the edge of the chip device 102. Optical ports 104 and 105 may either receive data from other devices or transmit data to another device. An optical port for receiving data may be implemented as a photodetector. Likewise, an optical port for transmitting data can be implemented as a laser. The optical ports may contain cleaved optical facets, processed etched facets, or photodetecting material.

The combination of optical ports on a edge is an optical segment 106. Optical segment 106 is composed of one or more optical ports 104 across the width of the segment for device 101, and optical segment 107 is composed of the optical ports 105 for device 102. Any number of segments may be present on a single chip device. Optical ports are placed along the optical segment with a precise spacing as patterned by the photolithographic processing of the chip device. Spacings between optical ports is to be no less than 10 $\mu$m and no greater than 1000 $\mu$m. The size of the optical ports should be no greater than a few microns for single-mode optical emission characteristics but may be larger if using multimode optical signals. Optical segments implemented as laser arrays can be constructed with the optical ports placed as close together as 10 $\mu$m with negligible crosstalk.

Lens 108 is positioned between optical segment 106 of chip device 101 and optical segment 107 of chip device 102. Lens 108 is a bulk optic lens that mode matches the separate images of optical ports from one optical segment to another. Optical signals, light waves emitted by a transmitting optical port 104 of optical segment 106, are directed or focused by lens 108 for detection by a receiving optical port 105 of optical segment 107. It will be readily seen by one skilled in the art that the converse is true for a transmitting optical port of segment 107 and a receiving optical port of segment 106. The interconnect of chip device 101 and chip device 102 is established by coupling the optical transmit and receive ports of the optical segments 106 and 107 through lens 108.

In an embodiment of the present invention, optical segments 106 and 107, as shown in FIG. 1, are constructed with a semi-circular geometry. A semi-circular geometry avoids magnification losses and maintains the best focus of the emitted light.

Still referring to FIG. 1, warpage of support 103 should be maintained to within 0.5 microns horizontally across the width of the optical segment 106 or optical segment 107, but one segment may be translated up or down by as much as 7-20 microns relative to the other. If excessive warpage is present in either the substrate or the chip device the interconnect may still operate but the usable segment width is reduced.

The width of optical segment 106 and optical segment 107 is dependent on the characteristics of the lens 108 utilized. In one embodiment, the width is less than 1000 $\mu$m wide. In this embodiment, if 10 $\mu$m spacing is used, over 100 optical interconnects between ports on separate chip devices can be established through one lens.

Lens 108 is aligned by handle 109, which is coupled to lens 108. Lens 108 is placed laterally to a positional accuracy of +/−0.5 $\mu$m, and the chip device is placed to a positional accuracy of about 7-20 $\mu$m. Positioning of the lens 108 requires active alignment with optical segment 106 and optical segment 107.

In one embodiment of the invention, a subset of the optical ports of chip device 101 and chip device 2 are utilized to guide the alignment of optical segments 106 and 107. Lens 108, providing the interconnect, is placed by powering guide lasers and detectors on the separate chip devices. The guide lasers and detectors are optical ports used for lens alignment. An alignment port may be used for other purposes after the alignment process. Once the guide alignment is accomplished, the alignment of the other ports is assured for that segment. A lens relief 113 on the support 103 prevents the lens from making contact and fouling with the support.

Figure 2:
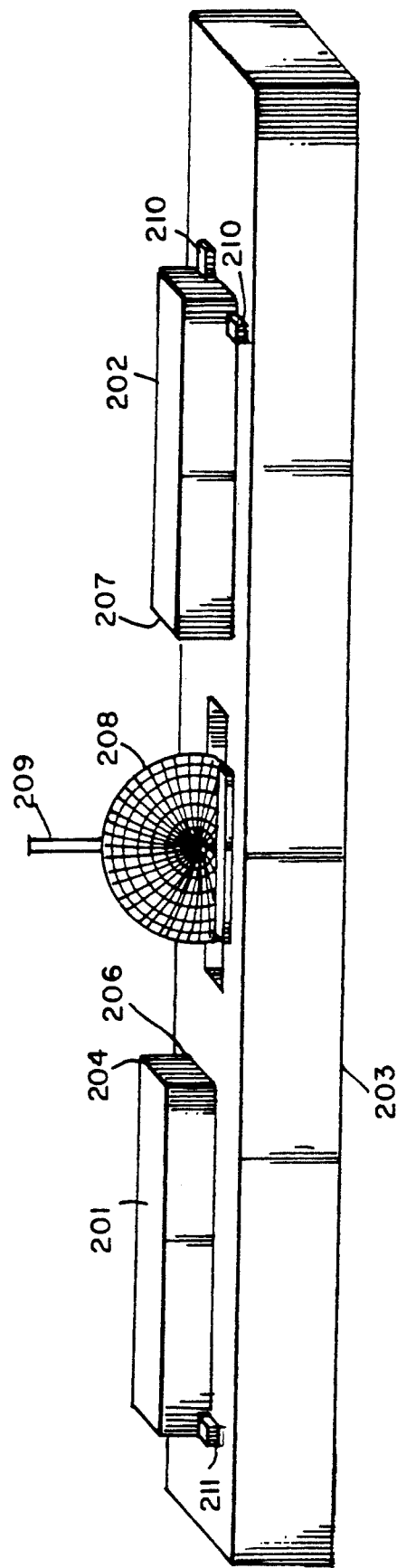
FIG. 2 is a perspective view of another embodiment of the current invention, showing the interconnect of two chip devices, each having a planar optical segment for communication.

Referring now to FIG. 2, another embodiment of the invention is depicted. Semiconductor device 201 and chip device 202 are mounted on support 203. Optical segment 206 of chip device 201 comprises one or more optical ports across the its segment width, and is constructed using straight cleaved optical ports 104 in a plane. Optical segment 207 of chip device 202 is constructed in the same manner as optical segment 206. Semiconductor device 201 communicates with chip device 202 via optical signals, transmitted and/or received by their respective optical segments, and focused by lens 208 which is positioned in a lens relief cavity. As was described in the previous embodiment, the chip devices are positioned by registration marks 210 and 211. In this embodiment, loss due to magnification variations may be reduced by increasing the segment to lens distance. Distances for various ball lenses are shown in FIG. 5. The distance is a function of the lens diameter and its index of refraction. Either reducing the index of refraction of the lens or increasing its size permits longer working distances. A GRIN or convex thin lens may also be used to accommodate longer distances.

Figure 3:
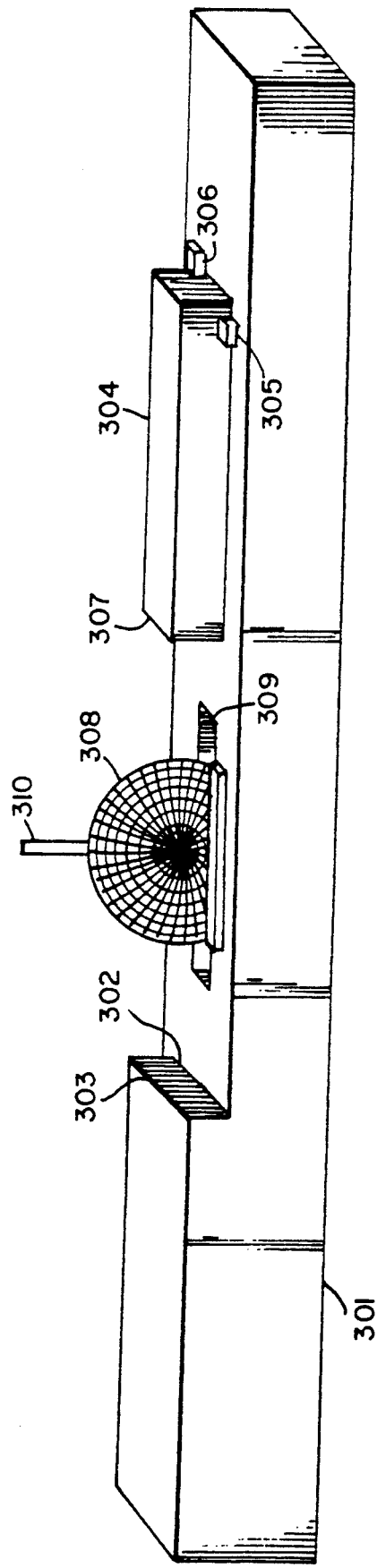
FIG. 3 is a perspective view of another embodiment of the current invention, showing the interconnect of two chip devices, one of which is grown from the substrate support.

Referring now to FIG. 3, another embodiment of the invention is depicted . Support 301 includes optical segment 302 with one or more optical ports 303 for communicating with chip device 304. Semiconductor device 304 is positioned on support 303 by use of registration marks 305 and 306. Semiconductor device 304 includes optical segment 307 with one or more optical ports for communicating with optical ports 303. Optical segment 302 and 307 may be of semi-circular form or planar. Optical signals emitted from either optical segment 302 or 307 are directed and focused to a target optical port via lens 308. Lens 308 is positioned in relief 309 through use of lens handle 310.

Figure 4A:
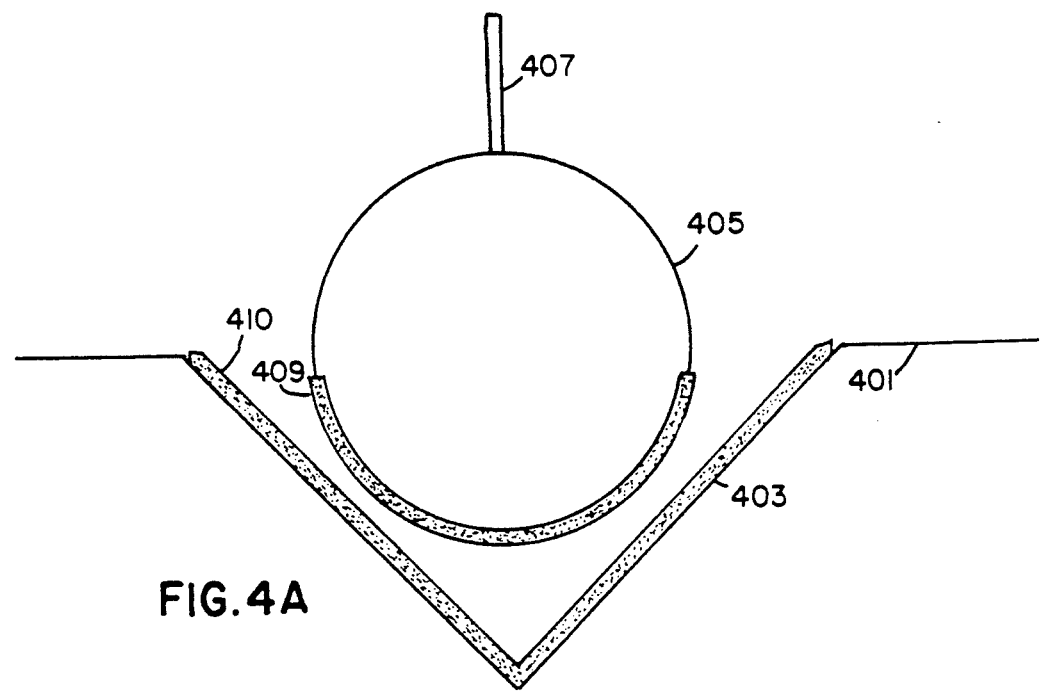
FIGS. 4(a) and (b) depicts the method of fixedly attaching the lens of the current invention to the lens relief using a reflowed soldering technique.
Figure 4B:
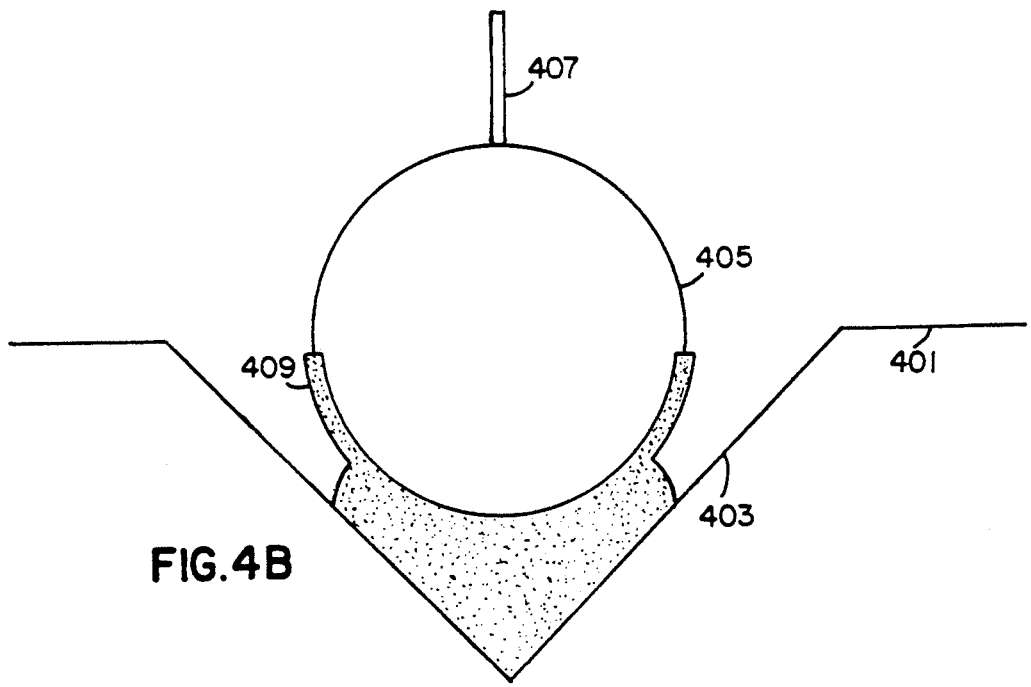

After active alignment, the lens may be fastened by laser soldering, soldering, or laser welding. These techniques customarily provide a +/−0.5 $\mu$m lateral alignment tolerance. The attachment structure of a ball lens for all embodiments mentioned herein will now be described. Referring now to FIG. 4. Support 401 includes lens relief 403 describing a "V" shaped cavity. Solder film 410 is vacuum deposited on the walls of lens relief 403. Ball lens 405, coated with metal 409 such as copper or nickel on its lower hemispheric surface and having handle 407 coupled to the opposite hemispheric surface is suspended by the handle within the cavity of lens relief 403 so as not to contact the walls of the lens relief. After heating of the lens relief, reflowed solder 411 accumulates at the base of the cavity, supporting the lens in place. Cooling of the solder creates a fixed attachment of the lens within the lens relief.

Figure 6:
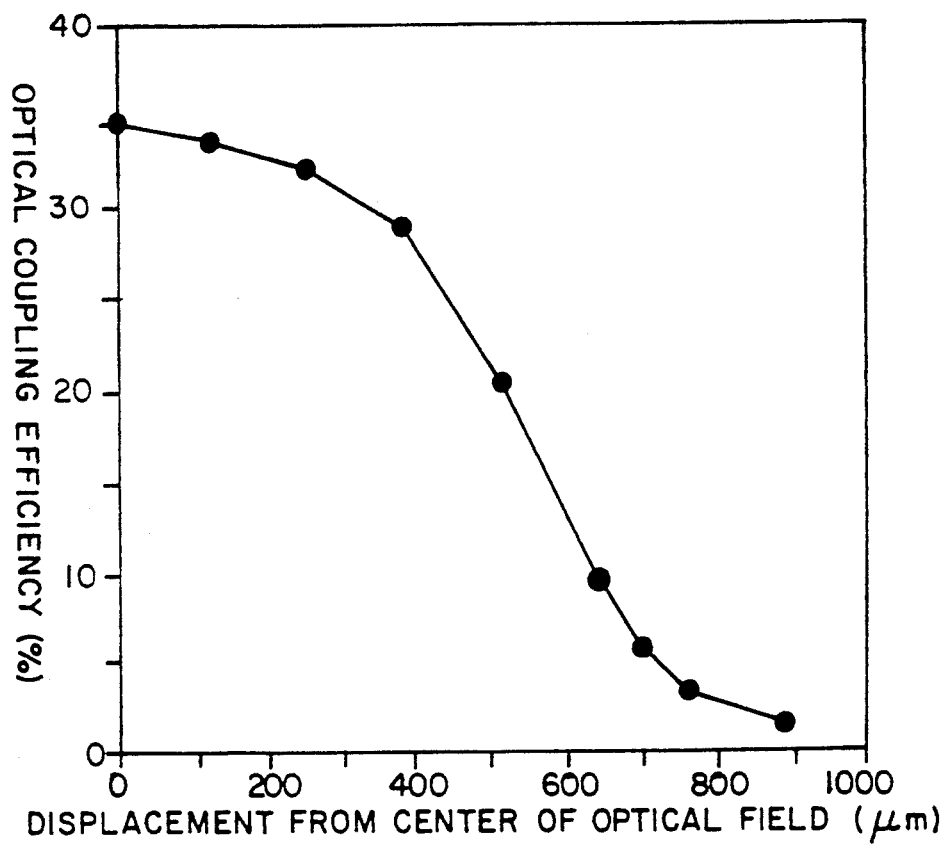
FIG. 6 is a graph predicting coupling efficiency across the semiconductor edge segments.

Referring to FIG. 6, wherein is depicted the efficiency of optical coupling as a function of lateral displacement from the center axis of the lens for a laser array, for a single GRIN lens, coupling efficiency remains higher than 20% (average 27%) over an optical field width of 1000 μm.

Figure 7:
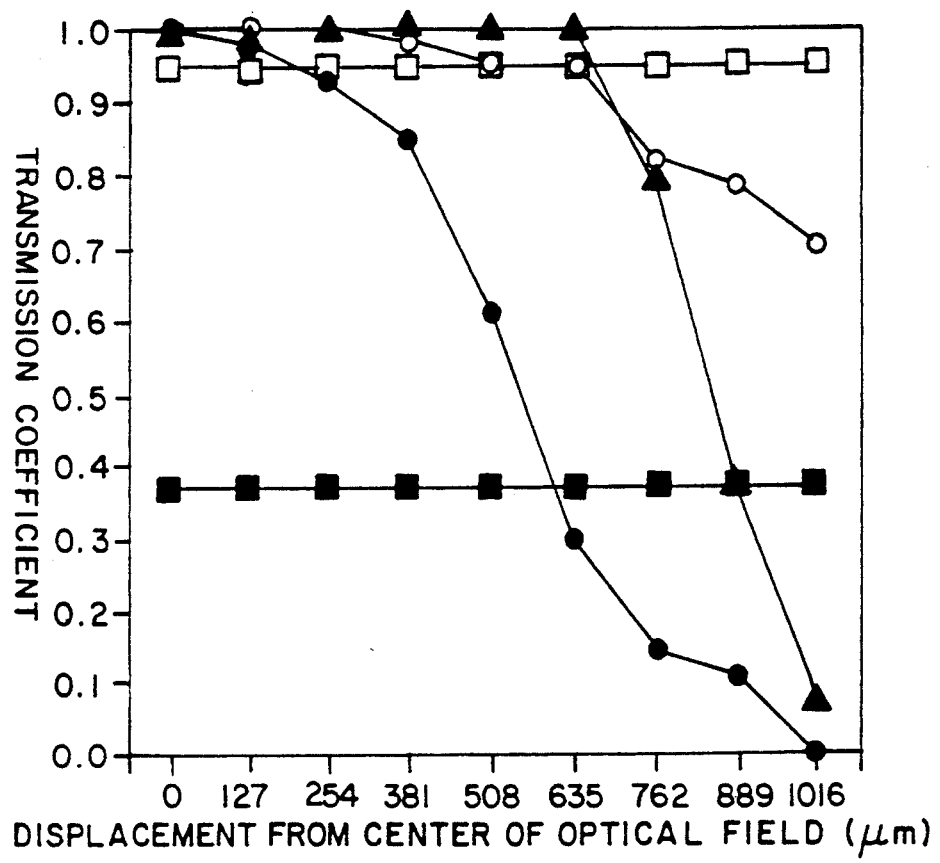
FIG. 7 is a graph plotting optical coupling loss versus displacement of the optical field for various optical defects.

Referring now to FIG. 7, a graph is depicted plotting optical coupling losses across a semiconductor edge segment versus the displacement in micro-meters from the center of the optical field for various optical defects. As is depicted by the graph, the greatest loss is due to lens aberration, followed by the effect of the numerical aperture limitation.

Figure 8:
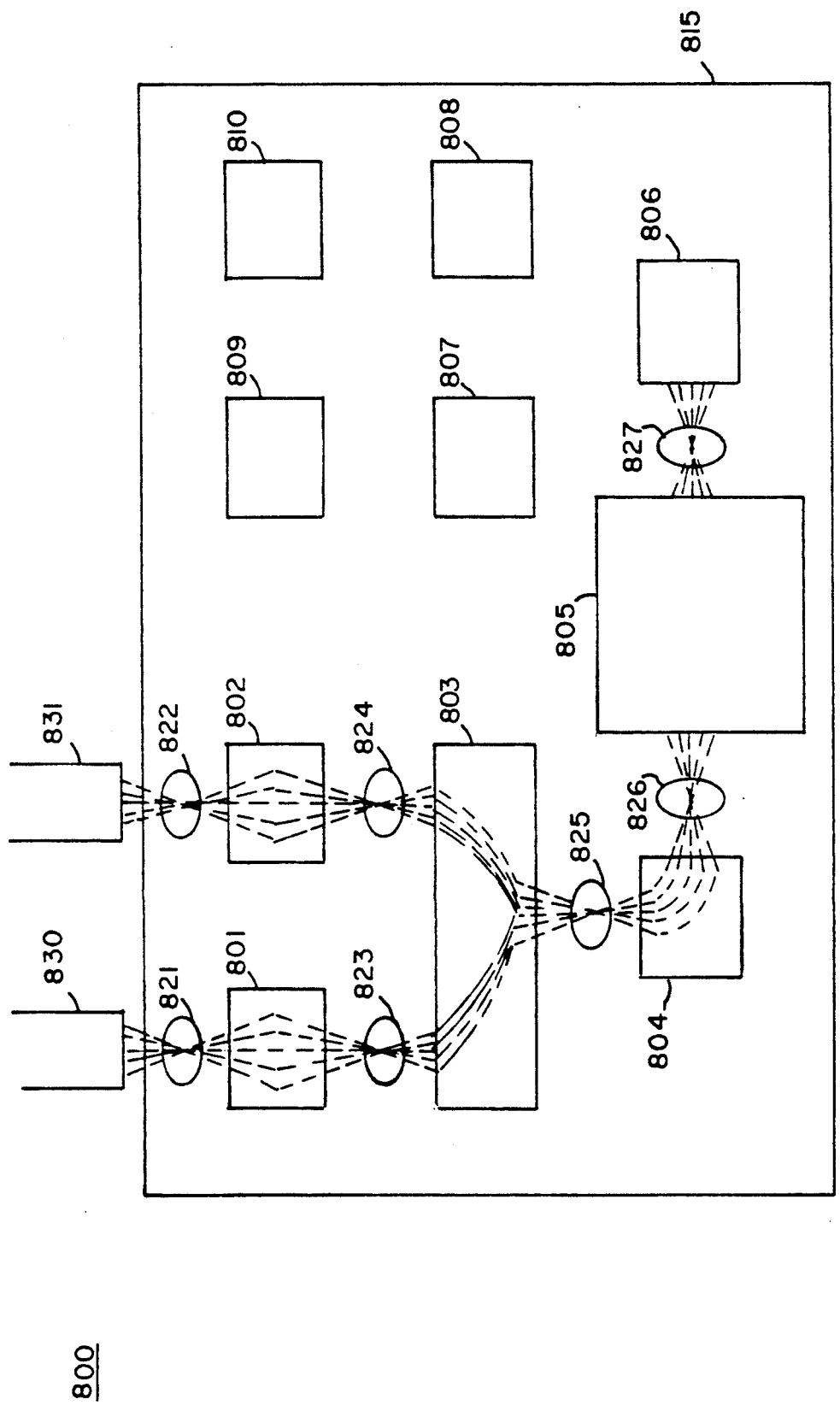
FIG. 8 is a plan view of various chip devices, mounted on a support, some of which utilize the optical interconnect of the instant invention for communication with other chip devices.

Referring now to FIG. 8 an opto-electronic multi-chip module is depicted. Semiconductor devices 801 through 810 are mounted on a support 815, constructed from a precision waferboard substrate. Semiconductor devices 807 through 810 are of a conventional design, and communicate with other chip devices using a buried or on surface traditional electronic interconnect. Semiconductor devices 801 through 806 communicate optically using lenses 821 through 827. Thus, chip device 801, using the present invention, communicates via optical signals with chip device 803, by use of lens 823. Device 803 and 804 are passive devices for directing the flow of the light, while 801, 802, 805, and 806 are active devices containing lasers or detectors. Further chip devices 801 and 802 communicate externally through respective fiber optic cables 830 and 831 via their respective optical ports and lenses 821 and 822. As was stated previously, the chip devices may either be active or passive devices. Further, it will be recognized by one of ordinary skill in the art that although devices 801 through 806 are shown to have optical communication with another device, they are not precluded from interfacing with that same device or another device on the support through traditional electronic means. Thus it will be recognized that chip device 805 can communicate with device 804 and 806 through the optical interconnect of the current invention, and also communicate with the same devices using electronic means. It is readily seen by one skilled in the art that electrical connections are made so that the chip devices are powered.

While there has been shown and described what is at present considered the preferred embodiment of the invention, it will be obvious to those skilled in the art that various changes and modifications may be made therein without departing from the invention as defined by the appended claims.

What is claimed is:

1. An opto-electronic interconnect comprising:
   a first semiconductor chip device having a first optical segment including a plurality of optical ports for transmitting or receiving optical signals;
   a second semiconductor chip device having a second optical segment including a plurality of optical ports for transmitting or receiving optical signals;
   a single lens for coupling an optical port of the first optical segment to a unique optical port of the second optical segment.

2. The opto-electronic interconnect of claim 1 wherein:
   said first optical segment and said second optical segment have a semi-circular geometry.

3. The opto-electronic interconnect of claim 1 wherein:
   said first optical segment and said second optical segment have a planar geometry.

4. The opto-electronic interconnect of claim 1 wherein: said lens is a ball lens.

5. The opto-electronic interconnect of claim 2 wherein:
   said lens is a ball lens.

6. The opto-electronic interconnect of claim 3 wherein:
   said lens is a ball lens.

7. The opto-electronic interconnect of claim 4 further comprising:
   a support, having a lens relief cavity, wherein said lens is fixedly received by said support within said relief cavity.

8. The opto-electronic interconnect to claim 5 further comprising:
   a support, having a lens relief cavity, wherein said lens is fixedly received by said support within said relief cavity.

9. The opto-electronic interconnect of claim 6 further comprising:
   a support, having a lens relief cavity, wherein said lens is fixedly received by said support within said relief cavity.

10. The opto-electronic interconnect of claim 7 wherein:
    said lens has a handle for aligning the focus of the lens.

11. The opto-electronic interconnect of claim 8 wherein:
    said lens has a handle for aligning the focus of the lens.

12. The opto-electronic interconnect of claim 9 wherein:
    said lens has a handle for aligning the focus of the lens.

13. A method of communicating an optical signal between a first semiconductor chip device, having a plurality of optical ports for transmitting or receiving optical signals, and a second semiconductor chip device having a plurality of optical ports for transmitting or receiving optical signals, through a single lens, the method comprising the steps of:
    transmitting optical signals from a plurality of optical ports of the first chip device;
    lens coupling each said transmitted optical signal to a unique optical port of the second chip device; and
    receiving the lens coupled optical signals at the said optical ports of the second chip device.

14. A method of fixedly attaching a ball lens having a handle coupled thereto, to a support with a lens relief cavity, the method comprising the steps of:
    coating the lower hemisphere of the ball lens with a metal;
    vacuum depositing a solder film on the walls of the lens relief;
    gripping said handle and suspending said ball lens with the lens relief;
    heating the walls of the lens relief;
    accumulating said solder film at the base of the lens relief;
    cooling said solder film.

* * * * *